United States Patent
Yu

(10) Patent No.: US 10,998,742 B2
(45) Date of Patent: May 4, 2021

(54) FIXING CONNECTOR WITH CHARGING MODULE

(71) Applicant: T-CONN PRECISION CORPORATION, New Taipei (TW)

(72) Inventor: Chien-Yi Yu, New Taipei (TW)

(73) Assignee: T-CONN PRECISION CORPORATION, New Taipei (TW)

( * ) Notice: Subject to any disclaimer, the term of this patent is extended or adjusted under 35 U.S.C. 154(b) by 502 days.

(21) Appl. No.: 15/398,762

(22) Filed: Jan. 5, 2017

(65) Prior Publication Data

US 2018/0191182 A1 Jul. 5, 2018

(51) Int. Cl.
*H02J 7/00* (2006.01)
*B62J 99/00* (2020.01)
*H01R 13/631* (2006.01)
*H01R 13/24* (2006.01)
*B62J 45/00* (2020.01)

(52) U.S. Cl.
CPC ............. *H02J 7/0042* (2013.01); *B62J 99/00* (2013.01); *H01R 13/6315* (2013.01); *B62J 45/00* (2020.02); *H01R 13/2421* (2013.01); *H01R 2201/26* (2013.01)

(58) Field of Classification Search
CPC ... H02J 7/0042; H01R 13/6205; H01R 11/30; H01R 13/2421; H01R 13/64; H01R 43/26
USPC ................... 320/107; 439/39, 247, 248, 289
See application file for complete search history.

(56) References Cited

U.S. PATENT DOCUMENTS

| | | | | |
|---|---|---|---|---|
| 5,292,267 A | * | 3/1994 | Kobayashi | G06F 1/1632 439/247 |
| 5,537,022 A | * | 7/1996 | Huang | H01M 2/105 320/107 |
| 6,346,007 B2 | * | 2/2002 | Yokoi | H01R 13/748 439/248 |
| 6,592,387 B2 | * | 7/2003 | Komenda | H01R 13/6315 439/247 |
| 7,121,857 B1 | * | 10/2006 | Lewis | H01R 13/6315 439/247 |
| 7,625,212 B2 | * | 12/2009 | Du | H01R 13/6205 439/39 |
| 7,632,131 B2 | * | 12/2009 | Lee | H05K 9/00 439/345 |
| 8,505,668 B2 | * | 8/2013 | Iwakami | B60K 1/04 180/220 |

(Continued)

*Primary Examiner* — Richard V Muralidar
(74) *Attorney, Agent, or Firm* — Bacon & Thomas, PLLC

(57) ABSTRACT

A fixing connector with a charging module which is an assembling structure of a fixing seat and a fixing stand, wherein the fixing seat comprises a seat and a charging module; the seat has a concave portion, the charging module is arranged in the concave portion and comprises a body, a plurality of first conductive terminals and at least an elastic piece; the body has a plane and at least an anti-misinsertion key arranged on the plane, the first conductive terminals are arranged on the body and may be protruded out from the plane, the elastic piece is arranged between the body and the seat; the fixing connector with the fixing seat and the fixing stand includes the said fixing seat and a fixing stand comprising a convex portion to assemble the fixing stand onto the fixing seat by inserting the convex portion in the concave portion. Thereby, the charging module may perform charging when the fixing stand is assembled onto the fixing seat.

5 Claims, 15 Drawing Sheets

(56) References Cited

U.S. PATENT DOCUMENTS

| | | | | |
|---|---|---|---|---|
| 8,545,247 B2 * | 10/2013 | Aldana | ............ | H01R 13/6315 |
| | | | | 439/248 |
| 9,090,301 B2 * | 7/2015 | Matsuda | ................ | B62J 11/19 |
| 9,153,980 B2 * | 10/2015 | Restrepo | ............... | H02J 7/0042 |
| 9,172,186 B2 * | 10/2015 | Chen | ...................... | H01R 13/64 |
| 9,346,368 B2 * | 5/2016 | Bito | ...................... | B60L 53/16 |
| 9,373,918 B2 * | 6/2016 | Kawai | ................ | H01R 13/582 |
| 9,490,578 B2 * | 11/2016 | Wu | .................... | H01R 13/642 |
| 2005/0070168 A1 * | 3/2005 | Xue | ..................... | H01R 24/64 |
| | | | | 439/676 |
| 2015/0333448 A1 * | 11/2015 | Wu | .................. | H01R 13/6205 |
| | | | | 439/39 |
| 2017/0093087 A1 * | 3/2017 | Esmaeili | ............... | H01R 12/61 |

* cited by examiner

FIXING CONNECTOR WITH CHARGING MODULE

BACKGROUND OF THE INVENTION

Field of the Invention

The invention relates to a fixing connector with a charging module, particularly to a fixing seat with a charging module as well as an assembling structure of the fixing seat and a fixing stand.

Descriptions of the Related Art

A conventional fixing stand of a bicycle and a fixing seat disposed on a parking pillar are as shown in FIGS. 1A and 1B, wherein the fixing stand 20 is disposed on a lower pipe of a bicycle, while the fixing seat 10 is disposed on the parking pillar next to a parking space, such that the bicycle is located on the parking pillar by allowing the fixing stand 20 to be engaged with and fixed to the fixing seat 10 when the bicycle is parked in the parking space. However, the conventional fixing seat 10 and the fixing stand 20 do not have charging module, so that the bicycle cannot be charged after it is parked at the parking pillar.

SUMMARY OF THE INVENTION

The major objective of the invention is respective arrangements of conductive terminals on a fixing stand and a fixing seat by utilizing an assembling structure of the fixing stand and the fixing seat, such that a bicycle is charged due to connection of terminals when the fixing stand is engaged with the fixing seat.

In the preferred embodiment of the invention, a fixing seat with a charging module is provided. A preferred embodiment of the fixing seat according to the invention includes a seat and a charging module; the seat has a concave portion, in which the charging module is arranged, which includes: a body, a plurality of first conductive terminals and at least an elastic piece. The body has a plane and at least an anti-misinsertion key arranged on the plane. The first conductive terminals are arranged in the body and may be protruded out from the plane. The elastic piece is arranged between the body and the seat.

In another preferred embodiment, the anti-misinsertion key includes a step portion arranged on the plane.

In another preferred embodiment, the body includes an outer frame and an assembly part mounted in the outer frame, on which the anti-misinsertion key is arranged, the first conductive terminals being arranged in the assembly part.

In the embodiments described above, the frame is made of metal, the assembly part is made of plastic.

In another preferred embodiment, the charging module further comprises at least a locating pin and at least a bolt, the body is locked in the concave portion by the locating pin and the bolt, the locating pin penetrates into the body, and the at least an elastic piece is harnessed around the locating pin.

In the embodiments described above, the at least an elastic piece is a compressible spring.

Additionally, a fixing connector of a fixing seat and a fixing stand is also provided in the invention. A preferred embodiment for the fixing connector of a fixing seat and a fixing stand according to the invention includes the fixing seat described above and a fixing stand; the fixing stand includes a convex portion, which is inserted in the concave portion of the fixing seat to assemble the fixing stand onto the fixing seat.

In the preferred embodiment described above, the convex portion has at least an anti-misinsertion groove corresponding to the at least an anti-misinsertion key, the anti-misinsertion key being inserted into the anti-misinsertion groove when the convex portion is inserted in the concave portion.

In the preferred embodiment described above, the convex portion has a plurality of second conductive terminals corresponding to the first conductive terminals, the first conductive terminals and the second conductive terminals forming electrical connection when the convex portion is inserted in the concave portion.

In another preferred embodiment, the first conductive terminals are pogo pins.

In another preferred embodiment, the first conductive terminals are arranged convexly on the plane fixedly, and the second conductive terminals are in a form of hole.

In another preferred embodiment, the body further has at least a first magnet disposed on the plane, the convex portion further has at least a second magnet corresponding to the at least a first magnet, the at least a first magnet attracts the at least a second magnet for the convex portion to be positioned in the concave portion when the convex portion is inserted in the concave portion.

Thereby, the bicycle may be charged by the charging module when the fixing stand of the bicycle is assembled onto the fixing seat of the parking pillar.

DETAILED DESCRIPTION OF THE PREFERRED EMBODIMENT

For clear understanding of the above and other objectives, features and advantages of the invention, various embodiments are described in more detail hereinafter in conjunction with attached drawings.

Figure 1A:
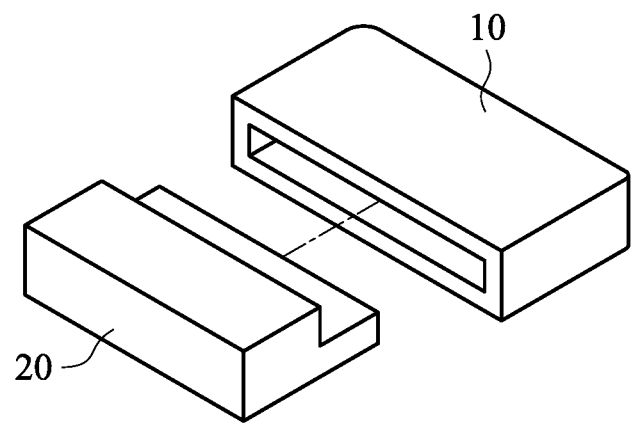
FIG. 1A is a stereo schematic diagram showing a conventional fixing stand of a bicycle and a fixing seat disposed on a parking pillar.
Figure 1B:
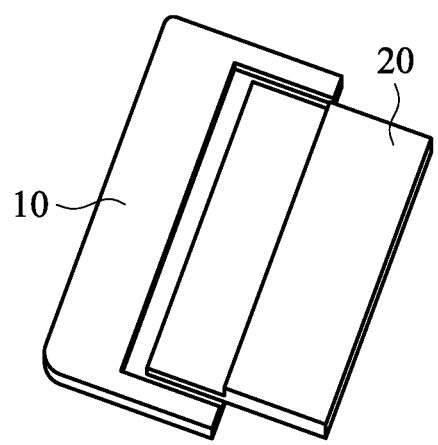
FIG. 1B is a stereo diagram showing assembling of the fixing stand and the fixing seat in FIG. 1A.
Figure 2A:
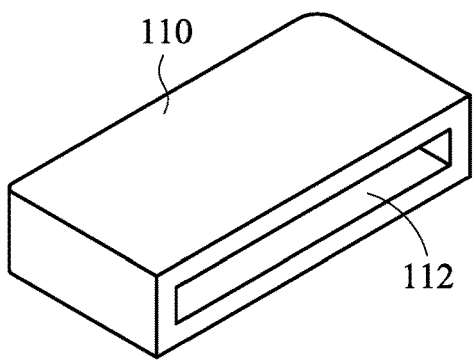
FIG. 2A is a stereo schematic diagram showing a preferred embodiment of a fixing seat according to the invention.
Figure 2B:
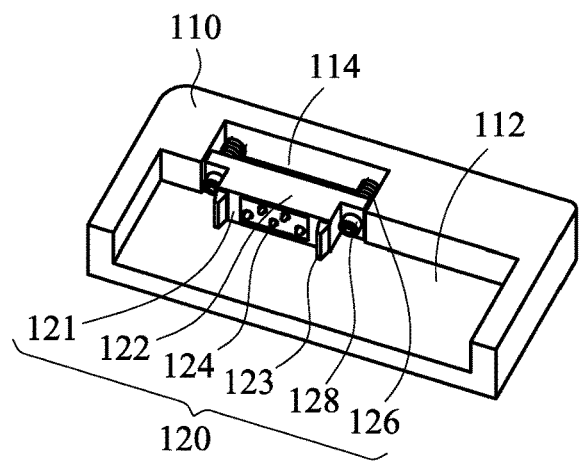
FIG. 2B is a stereo diagram showing the fixing seat in FIG. 2A with an uppermost part removed.
Figure 2C:
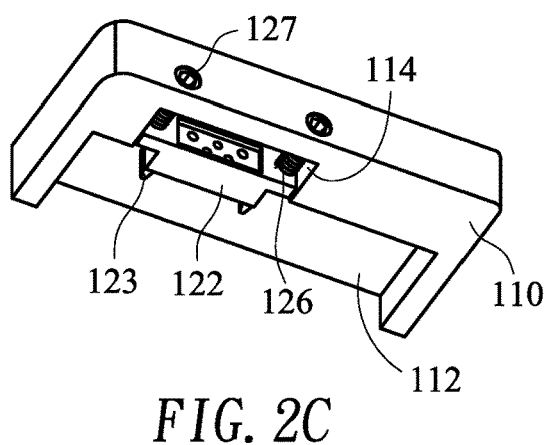
FIG. 2C is a stereo diagram showing the fixing seat of FIG. 2B viewed from another direction.

Refer to FIGS. 2A, 2B and 2C, which are a stereo schematic diagram showing a preferred embodiment of a fixing seat according to the invention, a stereo diagram showing a fixing seat with an uppermost part removed, and a stereo diagram showing the fixing seat of FIG. 2B viewed from another direction. A fixing seat 100 according to the invention includes a seat 110 and a charging module 120. As shown in FIG. 2A, the seat 110 is rectangular, and forms a concave portion 112 on a side thereof, into which insertion of the fixing stand 120 described later may be allowed. As shown in FIGS. 2B and 2C, the charging module 120 is arranged in the concave portion 112, and the charging module 120 is further disposed in an accommodation portion 114 of the concave portion 112. Moreover, the charging module 120 includes: a body 122, a plurality of first conductive terminals 124 and two elastic pieces 126. The first conductive terminals 124 are disposed on the body 122, the elastic pieces 126 are disposed between side walls of the body 122 and the accommodation portion 114, and two ends of the elastic pieces 126 push the side walls of the body 122 and the accommodation portion 114, respectively. The body 122 may move in the accommodation portion 114, and allow the body 122 to reset by elastic forces of the elastic pieces 126. The first conductive terminals 124 are made of metal, and the body 122 is made of plastic.

Figure 3:
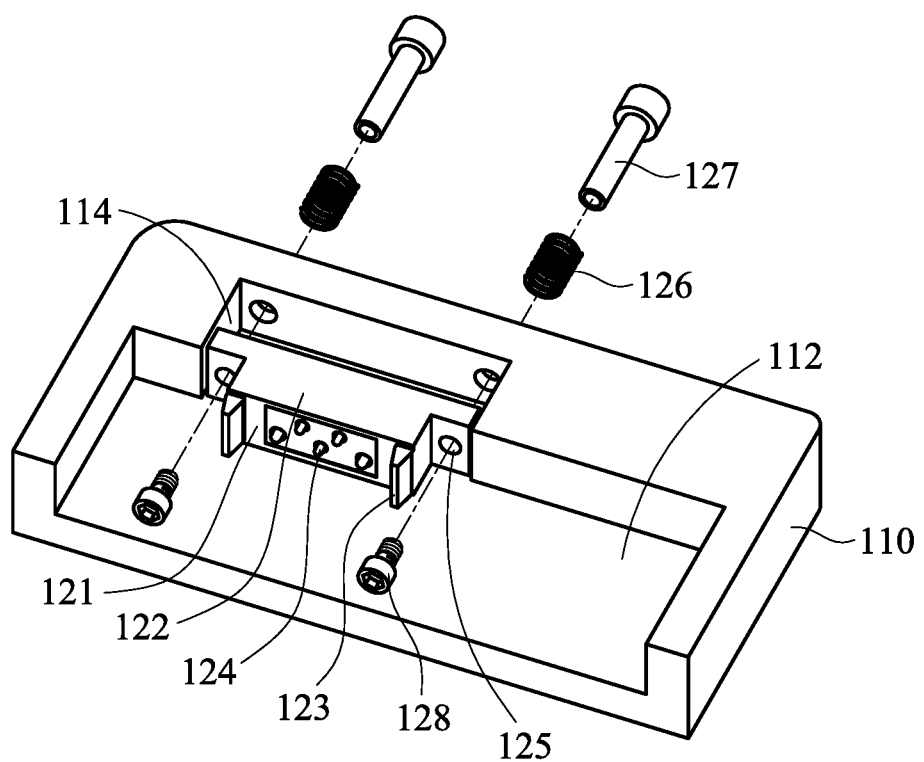
FIG. 3 is a stereo exploded diagram showing an embodiment for a charging module of a fixing seat according to the invention.
Figure 4:
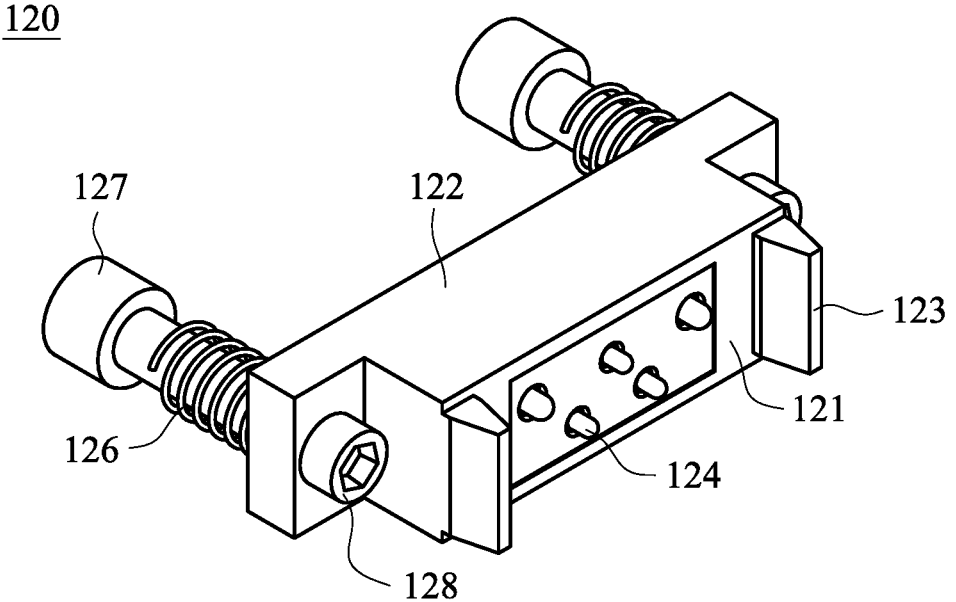
FIG. 4 is a stereo assembly diagram showing an embodiment of the charging module in FIG. 3.
Figure 5:
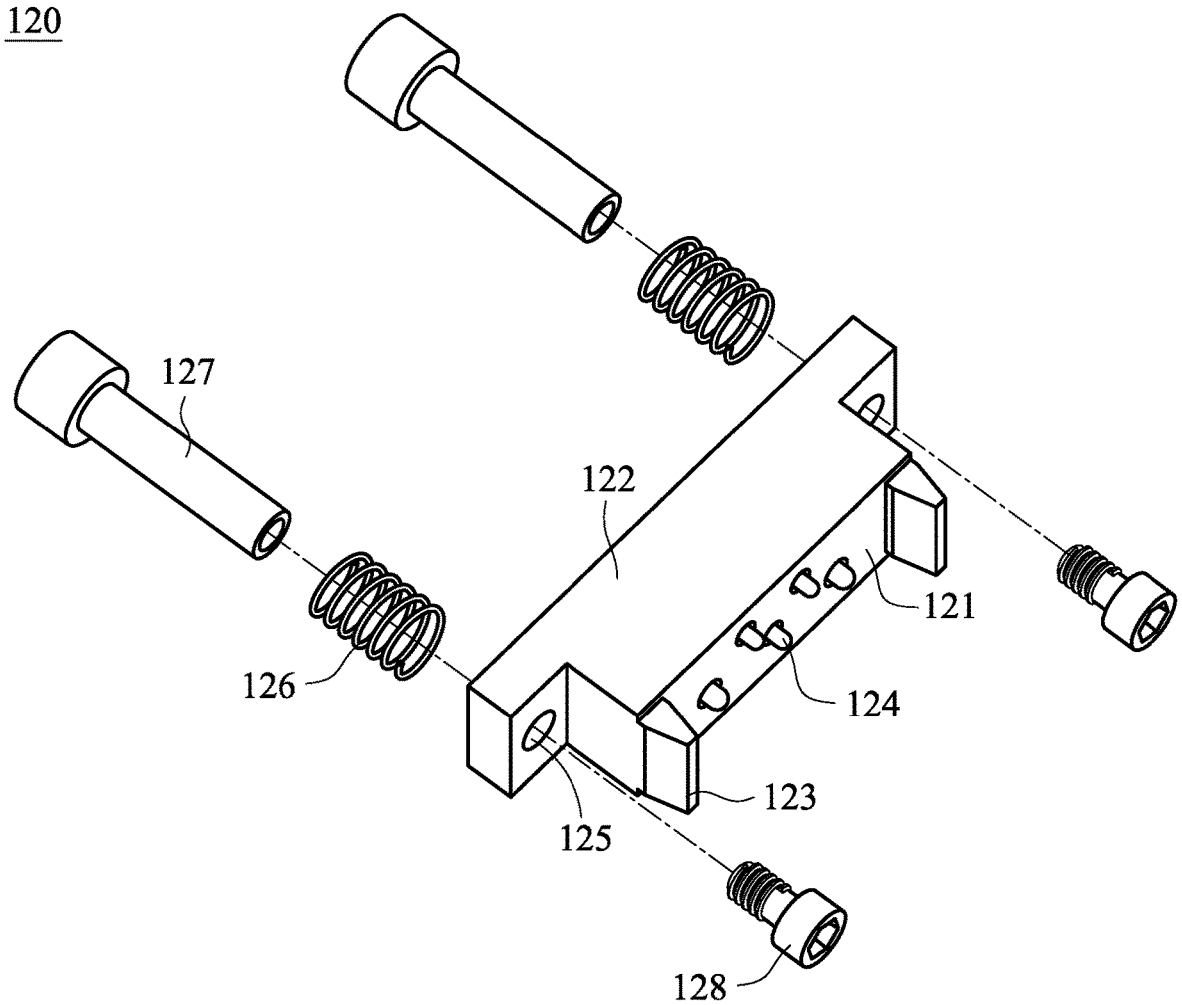
FIG. 5 is a stereo exploded diagram showing another embodiment for a body of the charging module in FIG. 4.

As shown in FIGS. 3, 4 and 5, which are a stereo exploded diagram showing a charging module of a fixing seat according to the invention, a stereo assembly diagram showing the charging module and a stereo exploded diagram showing a body of the charging module, respectively. The body 122 has a plane 121 and two anti-misinsertion keys 123 arranged on the plane 121. The first conductive terminals 124 are arranged in the body 122 and may be protruded out from the plane 121. The charging module 120 further includes two locating pins 127 and two bolts 128. As shown in FIGS. 2B and 2C, the body 122 penetrates through through-holes 125 on the body by the locating pins 127 for the bolts 128 to get screwed with the locating pins 127, followed by allowing the body 122 to be located in the accommodation portion 124 of the concave portion 122, while the elastic pieces 126 are harnessed around the locating pins 127. In this embodiment, the first conductive terminals 124 may be pogo pins. When the first conductive terminals 124 are pushed, the first conductive terminals 124 may be immersed in the body 122. After the pushing force vanishs, the first conductive terminals 124 are reset due to restored springs of the first conductive terminals 124. In this embodiment, the elastic piece 126 may be a compressible spring, for example.

Figure 6:
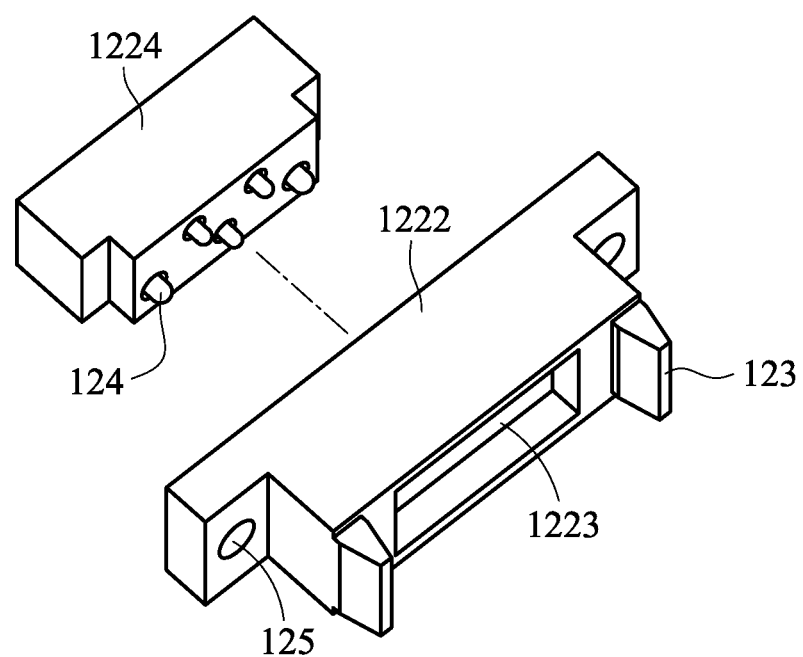
FIG. 6 is a stereo exploded diagram of FIG. 2B.

Refer to FIG. 6, which is a stereo exploded diagram showing the body 122. In the embodiment, the body 122 is a two-piece assembling structure, which includes an outer frame 1222 and an assembly part 1224. The outer frame 1222 has an accommodation slot 1223. The assembly part 1224 is mounted in the outer frame 1222 by mating in the accommodation slot 1223. The anti-misinsertion key 123 is arranged on the outer frame 1222. The first conductive terminals 124 are arranged in the assembly part 1224. In this embodiment, the outer frame 1222 is made of metal, and the assembly part 1224 is made of plastic. Moreover, the two-piece structure of the body 122 described above may also be formed integrally as a unitary structure.

Figure 7:
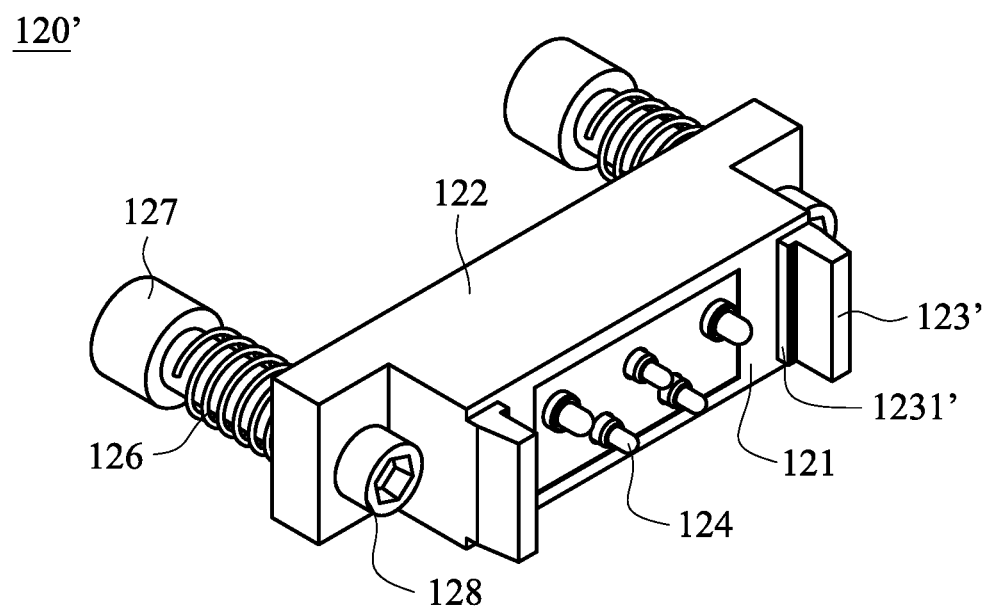
FIG. 7 is a stereo schematic diagram showing another embodiment for a charging module of a fixing seat according to the invention.

Refer to FIG. 7, which is a stereo schematic diagram showing another embodiment of the charging module according to the invention. The structure of the charging module 120' in this embodiment is basicly the same as that of the charging module 120 shown in FIG. 4, both of which differ in structure of charging module. The anti-misinsertion key 123' of the charging module 120' further has a step portion 1231'. The conductive terminals 124 are arranged convexly on the plane 121, such that the step portion 1231' may protect the terminals from damage in assembling with the fixing stand.

Figure 8:
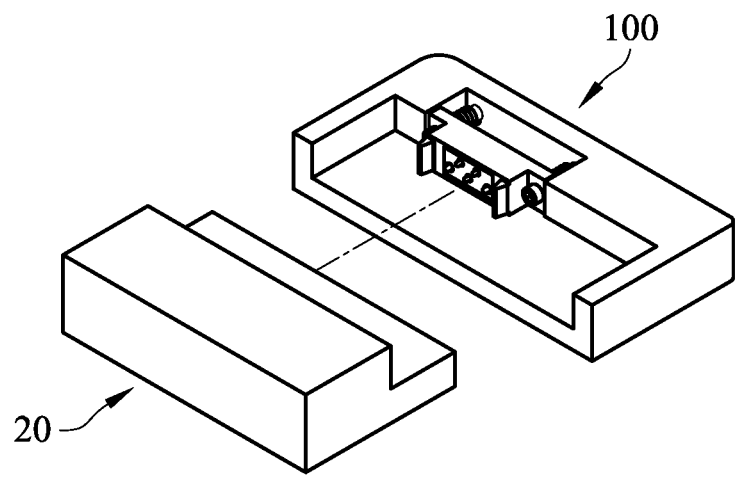
FIG. 8 is a stereo assembly diagram showing an assembling structure of the fixing seat in FIG. 2B with a conventional fixing stand.
Figure 8:
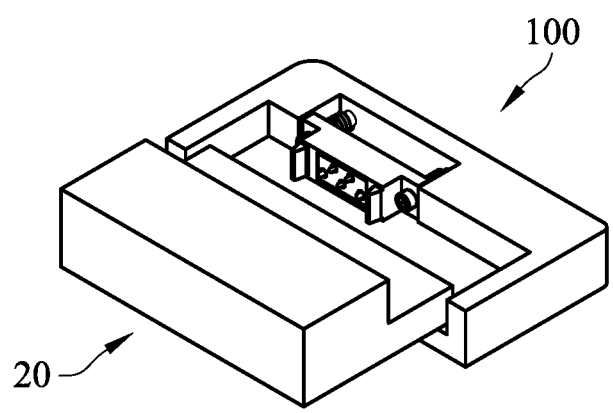

Refer to FIG. 8, which is a stereo schematic diagram showing an assembling structure of the fixing seat 100 according to the invention and the conventional fixing stand 20. Although the conventional fixing stand 20 does not have a charging module, it may still get engaged with and fixed into the fixing seat 100 of the invention. That is, a parking pillar equipped with the fixing seat 100 having a charging module according to the invention may also be used for a bicycle equipped with the conventional fixing stand 20. When the conventional fixing stand 20 is engaged with the fixing seat 100 of the invention, the fixing stand 20 will abut against the anti-misinsertion key 123 at first due to larger height of the anti-misinsertion key 123 than the height of the conductive terminals 124, so that the fixing stand 20 will not touch the first conductive terminals 124, and may be retained and located on the fixing seat 100.

Figure 9:
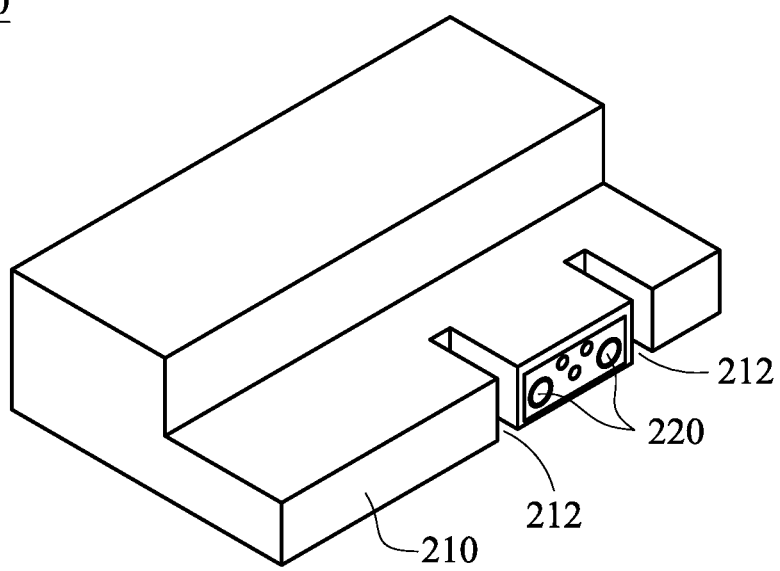
FIG. 9 is a stereo schematic diagram showing an embodiment of a fixing stand according to the invention.
Figure 10:
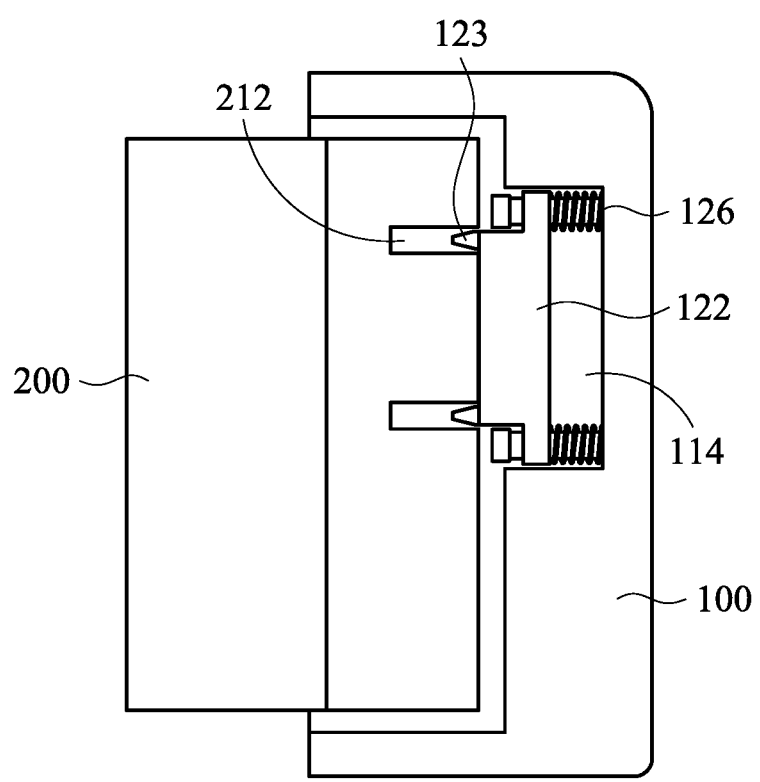
FIG. 10 is a stereo assembly diagram showing assembling of the fixing seat in FIG. 2B with the fixing stand in FIG. 9.
Figure 11:
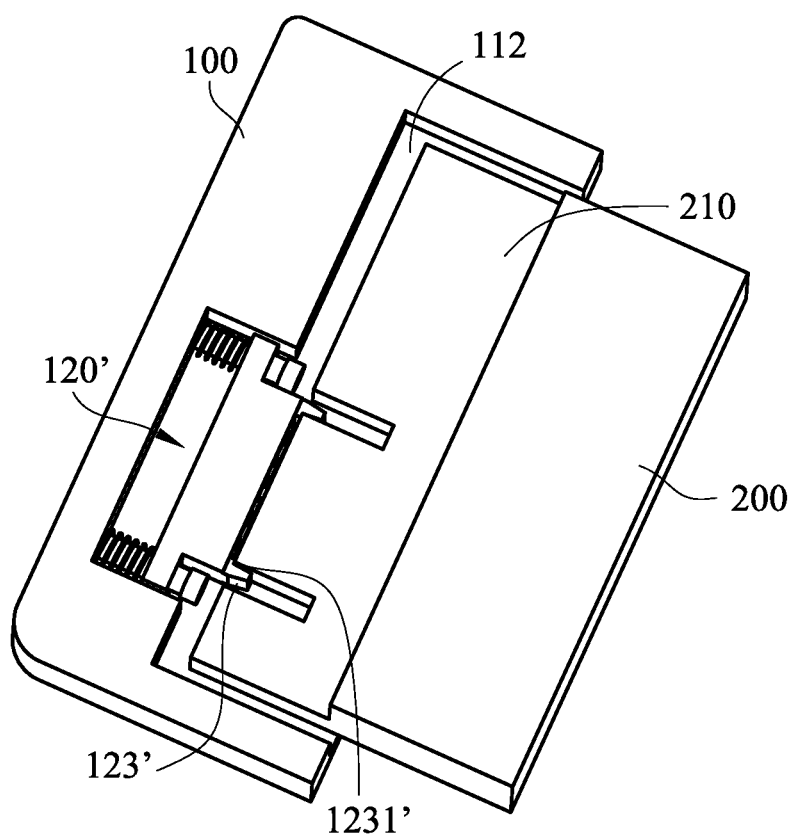
FIG. 11 is a stereo assembly diagram showing a fixing seat having the charging module shown in FIG. 7 and the fixing stand shown in FIG. 9.

Refer to FIG. 9, which is a stereo schematic diagram showing a preferred embodiment of a fixing stand 200 according to the invention. The fixing stand 200 according to the invention has a convex portion 210. Also, as shown in FIG. 10, the fixing stand 200 may be engaged into the fixing seat 100 by inserting the convex portion 210 into the concave portion 112 of the fixing seat 100. When the convex portion 210 is inserted into the concave portion 112, the convex portion 210 will push the body 122 for the body 122 to enter the accommodation portion 114, while the elastic piece 126 is compressed accordingly. When the fixing stand 200 is detached from the fixing seat 100, the convex portion 210 departs from the concave portion 112, while the elastic force of the elastic piece 126 resets the body 122. Additionally, the convex portion 210 has two anti-misinsertion grooves 212, which correspond to the anti-misinsertion keys 123 of the fixing seat 100, formed thereon. When the convex portion 210 is inserted into the concave portion 112 of the fixing seat 100, the anti-misinsertion keys 123 are inserted into the anti-misinsertion grooves 212. The fixing stand 200 further includes a plurality of second conductive terminals 220, which correspond to the first conductive terminals 124 of the fixing seat 100, arranged in the convex portion 210 and situated between the two anti-misinsertion grooves 212. When the convex portion 210 is inserted in the concave portion 112, the first conductive terminals 124 and the second conductive terminals 220 are electrically connected. FIG. 11 is a stereo assembly diagram showing assembling of the fixing stand 200 in FIG. 9 with the fixing seat 100 of the charging module 120' in FIG. 7. When the convex portion 210 of the fixing stand 200 is inserted into the concave portion 112 of the fixing seat 100, the front end of the convex portion 210 will abut against the step portion 1231' of the anti-misinsertion key 123' of the charging module 120', such that the fixing stand 200 may only reach the anti-misinsertion key 123' in insertion. Accordingly, terminals are protected from operation damage.

Figure 12:
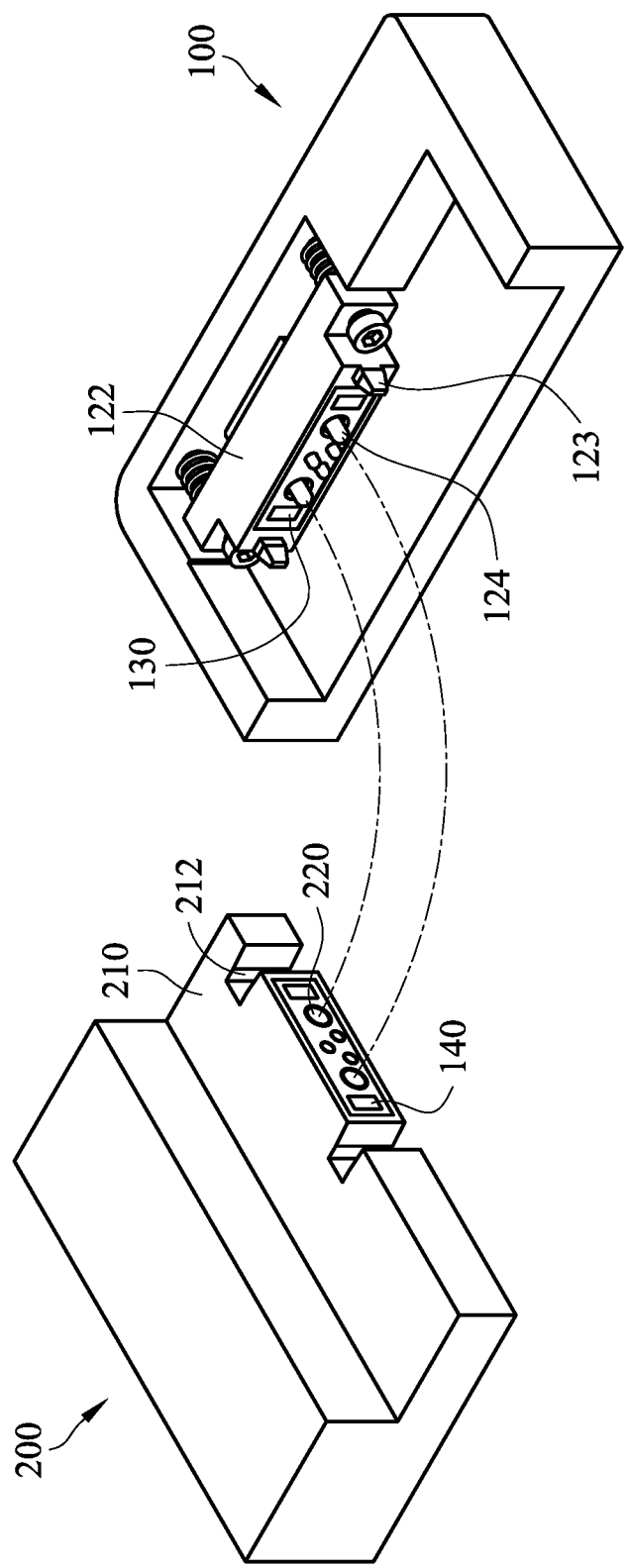
FIG. 12 is a stereo diagram showing another embodiment for a fixing connector of a fixing seat and a fixing stand according to the invention.

Refer to FIG. 12, which is a stereo diagram showing another embodiment for a fixing connector with a fixing seat and a fixing stand according to the invention. In the embodiment, the body 122 further has two first magnets 130 disposed on the plane 121 and situated on two sides of the first conductive terminals 124. The convex portion 210 further has two second magnets 140 corresponding to the first magnets 130. When the convex portion 210 is inserted into the concave portion 122, the first magnets 130 attract the second magnets 140, such that the convex portion 210 is positioned in the concave portion 122, such that the fixing stand 100 is engaged with and located in the fixing seat 200 more authentically.

Figure 13:
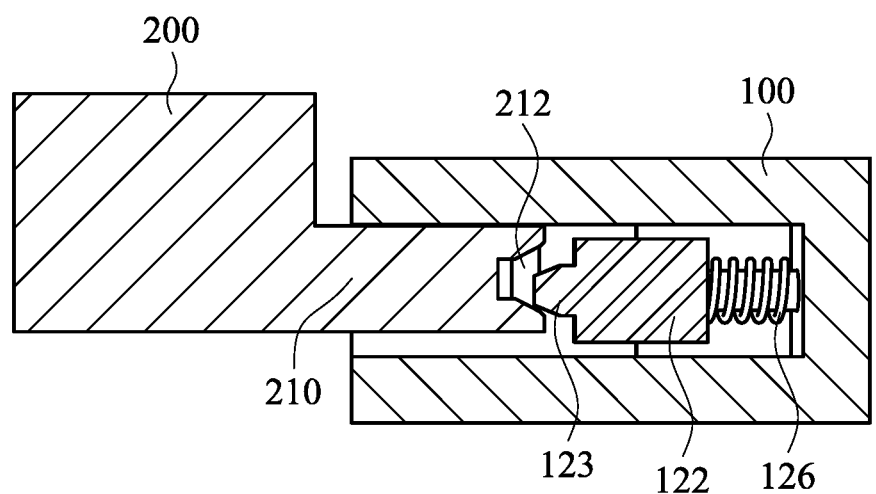
FIGS. 13 and 14 are sectional views showing another embodiment for a fixing connector of a fixing seat and a fixing stand according to the invention.
Figure 14:
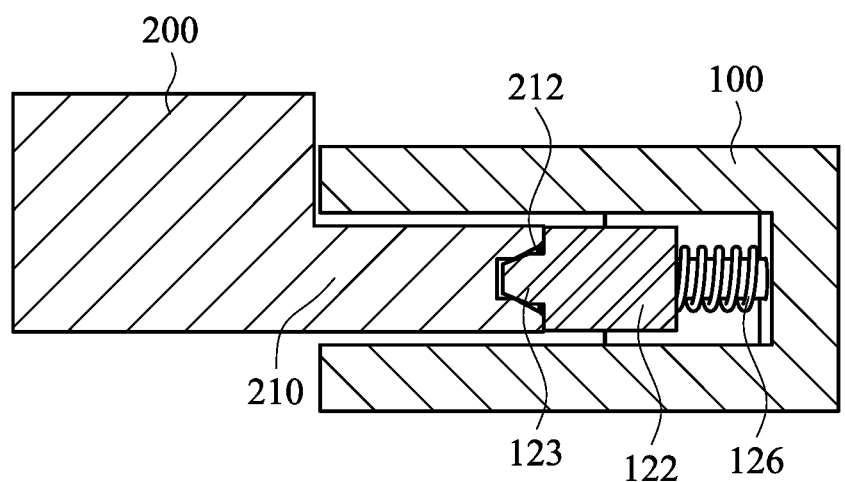

Refer to FIGS. 13 and 14, which are sectional views showing another embodiment for a fixing connector of a fixing seat and a fixing stand according to the invention. In the embodiment, the anti-misinsertion key 123 may also be in a form of pillar, while the anti-misinsertion groove 212 is in a form of groove, however the shapes and positions thereof are not limited in the invention. The anti-misinsertion key 123 and the anti-misinsertion groove 212 may also be disposed to meet the situation in which the tolerance is greater than normal condition for adjusting and guiding the combination to locate the fixing seat 100 and the fixing stand 200.

Figure 15:
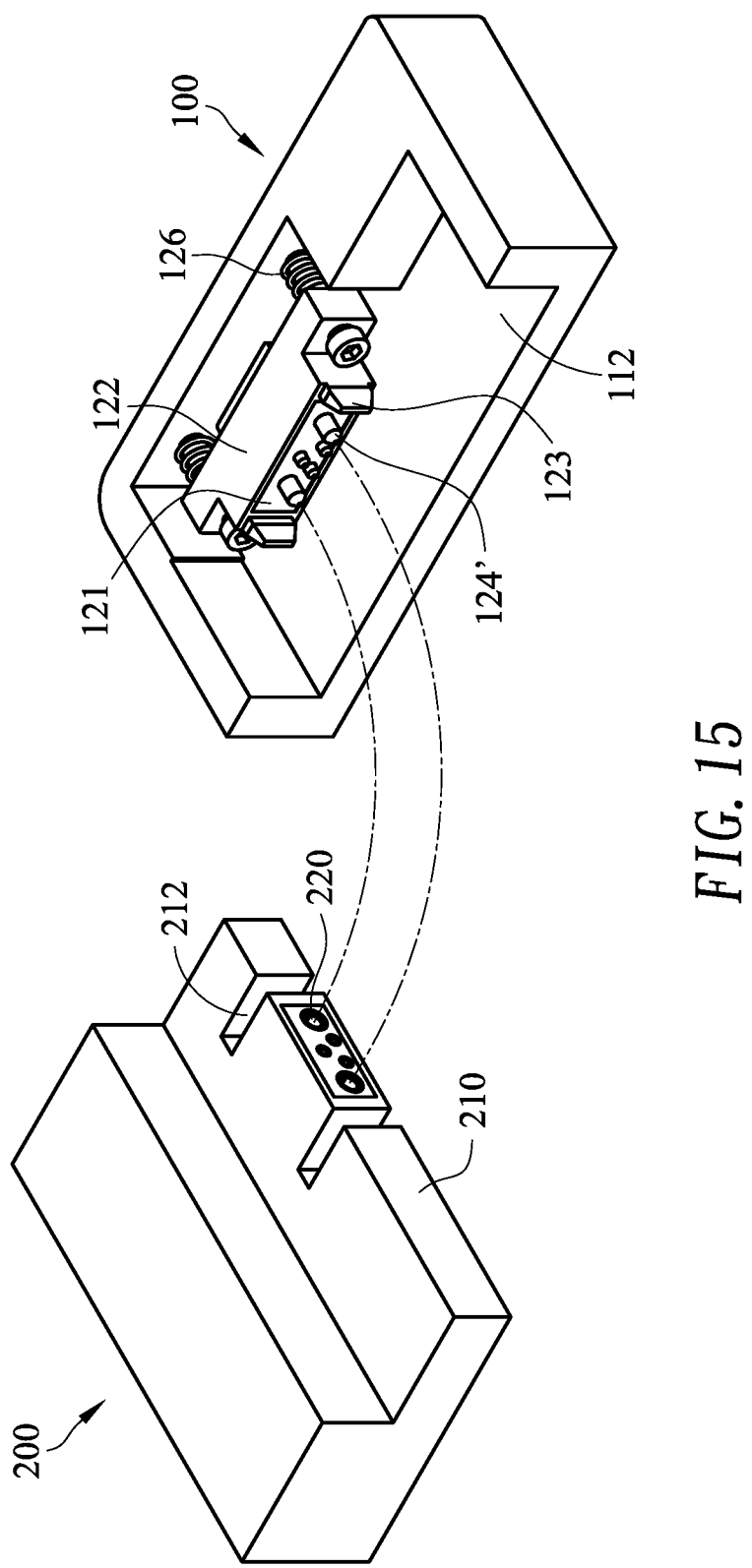
FIG. 15 is a stereo schematic diagram showing another embodiment for a fixing connector of a fixing seat and a fixing stand according to the invention.

Refer to FIG. 15, which is a stereo schematic diagram showing another embodiment for a fixing connector with a fixing seat and a fixing stand according to the invention. In the embodiment, the first terminals 124' are in the form of pillar arranged convexly on the plane 121 of the body 122 fixedly without terminal telescoping capability. When the convex portion 210 is inserted into the concave portion 122, the first conductive terminals 124' are inserted in the second conductive terminals 220 which are in the form of hole. Moreover, the convex portion member may also be instead disposed on the fixing seat, and the concave portion member may also be instead disposed on the fixing stand.

In summary, with electrical connection elements disposed in the fixing seat and the fixing stand respectively of the fixing connector according to the invention, when a user engages the fixing stand of a bicycle with the fixing seat of a parking pillar, electrically connected terminal elements are contacted with each other to achieve electrical connection and charge the bicycle. Furthermore, with disposition of anti-misinsertion structures according to the invention, the conventional fixing stand without charging module may also get engaged with the fixing seat having a charging module, such that the fixing seat of the invention may be applicable to both the conventional fixing stand without charging module and the new fixing stand with a charging module. Moreover, the fixing structure with a charging module according to the invention may be applied to various objects with the need to add a charging module, such as other vehicles, electronic or mechanical products etc. Thus, the invention does be practical for industrial application.

What is claimed is:

1. A fixing seat of a parking pillar of a fixing connector with a charging module, including:
    a seat having a concave portion, wherein the concave portion comprises an accommodating portion;
    the charging module arranged in the concave portion, comprising a body having a plane and at least an anti-misinsertion key arranged on the plane, and the body further comprising an outer frame made of metal and an assembly part made of plastic mounted in the outer frame, on which the anti-misinsertion key is arranged, wherein the charging module further comprising at least a locating pin and at least a bolt, the body is locked in the concave portion by the locating pin and the bolt, the locating pin penetrates into the body;
    a plurality of first conductive terminals arranged in the body and capable of being protruded out from the plane in the form of pillar; and
    at least an elastic piece arranged between the body and the seat.

2. The fixing seat of a parking pillar of a fixing connector with a charging module as claimed in claim 1, wherein the anti-misinsertion key comprises a step portion arranged on the plane.

3. A fixing connector having a fixing seat with a charging module of a parking pillar and a fixing stand of a bicycle, including:
    the fixing seat as claimed in claim 1; and
    the fixing stand comprising a convex portion, the fixing stand being assembled at the fixing seat by inserting the convex portion into the concave portion.

4. The fixing connector having a fixing seat with a charging module of a parking pillar and a fixing stand of a bicycle as claimed in claim 3, wherein the convex portion has at least an anti-misinsertion groove corresponding to the at least an anti-misinsertion key, the anti-misinsertion key being inserted into the anti-misinsertion groove when the convex portion is inserted in the concave portion.

5. The fixing connector having a fixing seat with a charging module of a parking pillar and a fixing stand of a bicycle as claimed in claim 4, wherein the fixing stand further comprises a plurality of second conductive terminals in the form of hole corresponding to the first conductive terminals, the first conductive terminals and the second conductive terminals are electrically connected when the convex portion is inserted in the concave portion.

* * * * *